Jan. 23, 1940.  E. E. CONDON  2,188,074
WHEEL PULLER
Filed July 6, 1938
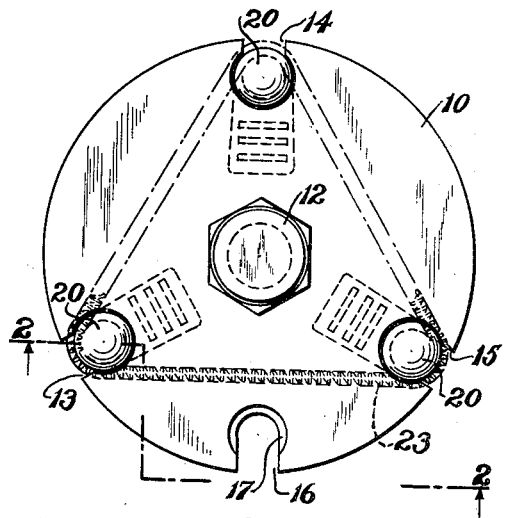
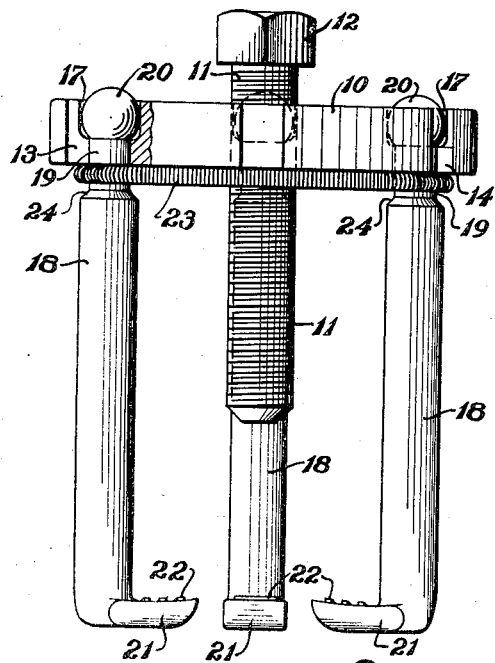
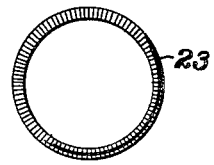
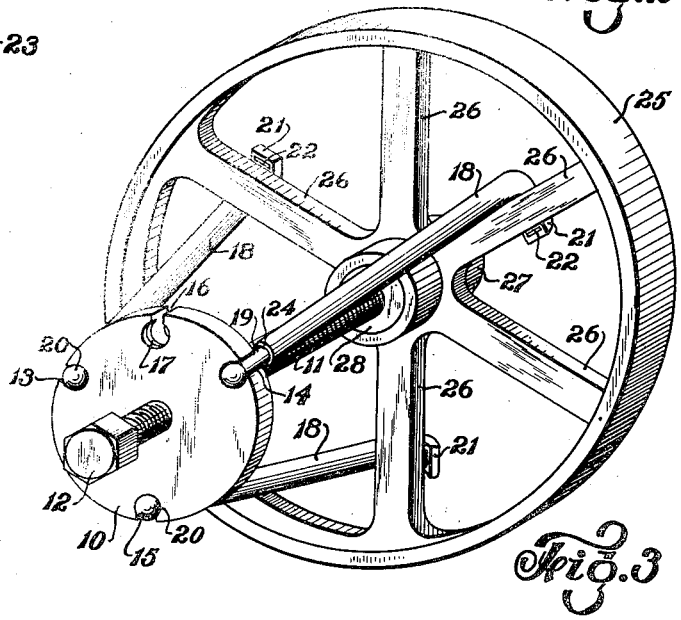
INVENTOR
ERNEST E. CONDON.
BY
VanDeventer & Grier
ATTORNEYS Patented Jan. 23, 1940

2,188,074

UNITED STATES PATENT OFFICE 2,188,074

WHEEL PULLER

Ernest E. Condon, Flushing, N. Y.

Application July 6, 1938, Serial No. 217,699

1 Claim. (Cl. 29—85)

This invention refers to improvements in wheel pullers and the like.

An object of the invention is to provide a device of the above nature which is easily applicable to a wide variety of wheels, pulleys, etc.

Another object is to provide a device of the above type in which all hinge and pivot pins are eliminated.

A further object is to provide a device of the above type including resilient means to automatically center the pulling rods in use and also to retain the rods in the pulling disk when the device is out of use.

Still another object is to provide a device of the above type which is strong, simple, compact, easily adjustable, readily disassembled and assembled, and cheaply and easily manufactured.

Other objects and advantages will become evident during the course of the following description in connection with the accompanying drawing, in which Figure 1 is an end view of a preferred form of the invention;

Figure 2 is a side elevation of the same partly broken away on the lines 2—2, Figure 1;

Figure 3 is a perspective view illustrating the application of the device to a spoked wheel; and Figure 4 is a detail view of the resilient retaining and adjusting ring or band.

Referring to Figures 1 and 2, the numeral 10 designates a puller disk of steel or other suitable material. A pressure screw 11 is threaded through the center of the disk 10 and is provided with a head 12 adapted to be engaged by a suitable wrench.

Radial slots 13, 14 and 15 are equally spaced in the circumference of the disk 10. A fourth slot 16 is located diametrically opposite the slot 14. The inner ends of the slots are countersunk to form sockets 17. Pull rods 18 have reduced portions or necks 19 terminating in balls 20 fitting freely in the sockets 17. The necks 19 are of smaller diameter than the width of the slots 13, 14, 15 and 16. Thus the rods 18 may be assembled in the disk by inserting the balls 20 into the sockets 17 and swinging the necks 19 through the slots. The rods are retained radially in the disk, as the diameter of the balls is greater than the width of the slots.

The ends of the rods 18 opposite the balls 20 have pulling angles or feet 21 formed thereon, and the contact surfaces of the feet may have ridges or threads 22 to assist in maintaining a positive grip while pulling. When the rods 18 are in place in the disk 10, a helical spring ring or band 23 may be snapped around the necks 19 as shown in Figures 1 and 2. This resilient band 23 acts as a retainer between the disk 10 and the shoulders 24 of the necks 19, thus preventing the rods 18 from being accidentally dislodged from the disk during handling. The inward tension of the band 23 also tends to swing the rods 18 radially toward the center line of the disk 10 and screw 11, thus serving to align the parts and ensure the most advantageous pulling adjustment under certain circumstances as hereinafter set forth.

The operation of the device is as follows:

In various fields of service and repair work, for example in the servicing of electric refrigerating equipment, it is frequently necessary to remove flywheels, motor pulleys and the like from tight-fitting shafts. This operation requires the use of a puller, and various devices have been made for this purpose, usually in the form of yokes to which the pulling members are hinged. However, in the course of a general service business a variety of conditions are met with, some requiring that the member be gripped by the spokes, some by its rear end or by a solid flange, some by an interior flange, etc. These different conditions require different directions and arrangements of the pulling and gripping members, and with previous devices it has been necessary to provide a number of separate pullers or principal parts thereof to meet these various requirements, thus adding to the bulk, weight and complication of the equipment which must be carried.

In the present invention the rods 18 may be revolved and swung to bring the feet 21 into any desired gripping position, the feet being directed inward, outward, or at any required angle. For example, Figure 3 illustrates the device being applied to a wheel 25 having six spokes 26. It will be seen that the rods 18 have been inserted between the spokes and the feet 21 are turned tangentially to engage the backs of three evenly spaced spokes. With the device loosely in the position shown the spring band 23 may be snapped in place as previously described, whereupon the tension of the spring swings the rods inward until the feet 21 assume positions as near as possible to the hub 27 and shaft 28, thus ensuring the minimum strain on the spokes. The head 12 is then revolved to force the point of the screw 11 against the end of the shaft 28 and thereby withdraw the wheel 25.

It is obvious that the puller may be applied to the wheel with the spring 23 already in place but the device has been illustrated in Figures 3 and 4 with the parts separated in order to show the structures most clearly. In certain cases, such as that of a webbed pulley with an internal flange which must be gripped outwardly, the pulling operation may be carried out with the spring removed.

When the construction of the member to be removed makes it desirable or necessary to grip the member at diametrically opposite points, as in the case of a four-spoked wheel, the rods 18 are removed from slots 13 and 15 and one rod inserted through slot 16, thus providing two diametrically opposite pull rods.

From the foregoing it will be seen that the invention comprises a substantially universal pulling device, a single assembly being adaptable to a wide variety of applications hitherto requiring a number of tools as previously set forth. The assembly contains a minimum number of simple parts and the rods and screw may be readily disassembled from the disk 10 and packed flat for compactness in transportation. The spring action automatically operates the device to cause gripping as near the center of pressure as possible, placing minimum stress on the structure being removed, while the thick circular disk 10 and other parts are adapted to provide the maximum rigidity and strength necessary for smooth action and durability.

It will be understood that the device is not limited to the four-slot construction shown, as for some special types of service other numbers of slots and rods may be provided. Thus, while the invention is shown throughout in preferred form, it is not limited to the exact structures illustrated, as various modifications may be made without departing from the scope of the appended claim.

What is claimed is:

In a pulling device, in combination, a rigid disk having a plurality of circumferentially spaced sockets formed therein, each socket comprising a bore of large and small diameter, radial slots leading from said sockets to the periphery of said disk, said slots being less in width than the large diameters of the sockets, a plurality of pulling rods, balls on the ends of said rods adapted to be mounted in the large diametered bore of said sockets, the portions of said rods adjacent said balls being reduced to a diameter less than the widths of said slots and of a length slightly greater than the thickness of said disk, whereby said rods may freely move in a plurality of directions, work engaging members carried on the other ends of said pulling rods, spring means engaging the reduced diametered portion of said members beneath said disk after said balls are mounted thereby retaining said members in said sockets and at the same time urging said members toward the axis of said disk, and a pressure screw threaded through the center of said disk.

ERNEST E. CONDON.